United States Patent
Jeong et al.

(10) Patent No.: US 6,393,188 B1
(45) Date of Patent: May 21, 2002

(54) DISPERSION COMPENSATION DEVICE AND OPTICAL TRANSMISSION SYSTEM WITH THE SAME

(75) Inventors: Ki-Tae Jeong; Young-Tark Lee; Ho-Jin Jeong; Han-Kyo Seo; Jeong-U Jeon; Tae-Sang Park; Seok-Bong Ko, all of Taejeon; Yun-Hee Cho, Seoul; Seong-Il Choi, Kyounggi-Do; Sang-Woork Park, Seoul, all of (KR)

(73) Assignees: Korea Telecom, Sungnam-shi; Daewoo Telecom Ltd., Incheon-shi, both of (KR)

( * ) Notice: Subject to any disclaimer, the term of this patent is extended or adjusted under 35 U.S.C. 154(b) by 0 days.

(21) Appl. No.: 09/388,488

(22) Filed: Sep. 2, 1999

(30) Foreign Application Priority Data

Sep. 2, 1998 (KR) .............................. 98-36042

(51) Int. Cl.[7] .................................................. G02B 6/16
(52) U.S. Cl. ....................................... 385/123; 385/124
(58) Field of Search ................................ 385/123, 124, 385/126, 127, 141; 359/161, 341

(56) References Cited

U.S. PATENT DOCUMENTS

| 5,361,319 A | 11/1994 | Antos et al. ................ 385/123 |
| 5,448,674 A | 9/1995 | Vengsarkar et al. ........ 385/123 |
| 5,555,340 A | 9/1996 | Onishi et al. ................ 385/127 |
| 5,568,583 A | 10/1996 | Akasaka et al. ............ 385/123 |
| 5,995,694 A | * 11/1999 | Akasska et al. ............ 385/123 |
| 6,084,993 A | * 7/2000 | Mukasa ........................ 385/24 |

* cited by examiner

Primary Examiner—Cassandra Spyrou
Assistant Examiner—Euncha Cherry
(74) Attorney, Agent, or Firm—Staas & Halsey LLP

(57) ABSTRACT

A dispersion compensation device and an optical transmission system are capable of simultaneously compensating a dispersion value and dispersion slope in a single-mode optical fiber in a high-speed long-distance optical transmission system and a wavelength division optical transmission system. The dispersion compensation device includes N number of component optical fibers arranged in a serial fashion, N being a positive integer more than one, wherein each of the component optical fiber has a different dispersion value per a unit length, a dispersion slope per a unit length, and a different length.

8 Claims, 2 Drawing Sheets

DISPERSION COMPENSATION DEVICE AND OPTICAL TRANSMISSION SYSTEM WITH THE SAME

FIELD OF THE INVENTION

The present invention relates to an optical transmission system; and, more particularly, to a dispersion compensation device which is capable of simultaneously compensating an accumulated dispersion and dispersion slope of a single-mode optical fiber in a high-speed long-distance optical transmission system and a wavelength division transmission system in an effective manner.

DESCRIPTION OF THE PRIOR ART

Generally, when, in a high-speed long-distance optical transmission system, optical signals are transmitted through a single-mode optical fiber, a transmission speed and a transmission distance are greatly restricted by a dispersion of the single-mode optical fiber. Consequently, for the high-speed long-distance transmission system, a device, which is capable of compensating for a total amount of an accumulated dispersion value of the single-mode optical fiber, is necessarily required. Particularly, in the case of a multi-channel wavelength division multiplexing optical transmission system, a dispersion slope as well as the total amount of the dispersion values also need to be compensated through a dispersion compensation device.

A conventional single-mode optical fiber for use in a high-speed long-distance transmission system is designed to transmit optical signals having the wavelength band of 1310 nm. The conventional single-mode optical fiber has the dispersion value at near zero in the wavelength band of 1310 nm. With the development of the optical amplifying technology, however, the transmission wavelength band has a tendency to be diverted to a wavelength band of 1550 nm. In addition, with a transmission capacity becoming increased, the transmission speed becomes highly increased and a wavelength division transmission method for transmitting different signals having several wavelengths, should be used.

On the other hand, the single-mode optical fiber has the dispersion of approximately 17 ps/(nm·km) in the wavelength band of 1550 nm, so that there is a distance restriction in the high-speed optical transmission system. For example, in transmitting the optical signals at the speed of 10 bps, an available transmission distance is approximately 60 km. As is well known to those skilled in the art, with the increase of transmission speed, the available transmission distance is inversely proportional to a square of the ratio of speed increase. Accordingly, in the high-speed long-distance optical transmission system using the single-mode optical fiber, there has been proposed a method for compensating a dispersion of the single-mode optical fiber using a dispersion compensation device, wherein the dispersion may restrict an available transmission distance.

The conventional dispersion compensation device has a dispersion value, which is of opposite sign and magnitude identical to the accumulated dispersion values of the single-mode optical fiber. In addition, the dispersion compensation device is coupled to the single-mode optical fiber and has a function to make the sum of dispersion values of the single-mode optical fiber and the dispersion compensation device zero. Meanwhile, in the wavelength division optical transmission system using various wavelengths, a dispersion of each of the wavelengths should be compensated and an dispersion slope of each of the wavelengths should be also compensated. Here, the dispersion slope is defined by a derivative of the dispersion value per a unit length of the optical fiber with respect to each wavelength.

The conventional dispersion compensation optical fiber is designed to have a very large negative dispersion. In the dispersion compensation optical fiber, a dispersion value per a unit length of the dispersion compensation optical fiber, a dispersion slope per a unit length of the dispersion compensation optical fiber, and a length of the dispersion compensation optical fiber are determined as follows:

$$L_{smf} \times D_{smf} + L_{dcf} \times D_{dcf} = 0 \qquad \text{(Eq. 1)}$$

$$\frac{S_{smf}}{D_{smf}} = \frac{S_{dcf}}{D_{dcf}} \qquad \text{(Eq. 2)}$$

where, $L_{smf}$ is a length of a single-mode optical fiber, $D_{smf}$ is a dispersion value per a unit length of the single-mode optical fiber, $S_{smf}$ is a dispersion slope per a unit length of the single-mode optical fiber, $L_{dcf}$ is a dispersion value per a unit length of the dispersion compensation optical fiber, and $S_{dcf}$ is a dispersion slope per a unit length of the dispersion compensation optical fiber.

As described above, the conventional dispersion compensation device is composed of one kind of optical fiber. Therefore, since the dispersion slope as well as the dispersion value should be compensated by exactly adjusting the ratio between the dispersion value and the dispersion slope by using one kind of the dispersion compensation optical fiber, there has been a disadvantage that it is difficult to fabricate the dispersion compensation optical fiber and to obtain a desired characteristic of the dispersion compensation optical fiber.

SUMMARY OF THE INVENTION

It is, therefore, an object of the present invention to provide a dispersion compensation device which is capable of simultaneously compensating an accumulated dispersion and dispersion slope of a single-mode optical fiber in a high-speed long-distance optical transmission system and a wavelength division optical transmission system in an effective manner.

In accordance with an embodiment of the present invention, there is provided an apparatus for use in an optical transmission system having a single-mode optical fiber, for simultaneously compensating a dispersion value and a dispersion slope in the single-mode optical fiber, comprising: a dispersion compensating fiber containing N number of component optical fibers arranged in a serial fashion, N being a positive integer more than one, wherein each of the component optical fibers has a different dispersion value per a unit length, a different dispersion slope per a unit length and a different length.

In accordance with another embodiment of the present invention, there is provided an optical transmission system for transmitting an optical signal emitted by a transmitter to a receiver, comprising: a) a single-mode optical fiber for providing a path wherein the optical signal is passed therethrough; and b) a dispersion compensator, connected to said the single-mode optical fiber, wherein said dispersion compensator includes a dispersion compensating fiber containing N number of component optical fibers arranged in a serial fashion, N being a positive integer more than one, each of the component optical fibers having a different dispersion value per a unit length, a different dispersion slope per a unit length and a different length.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
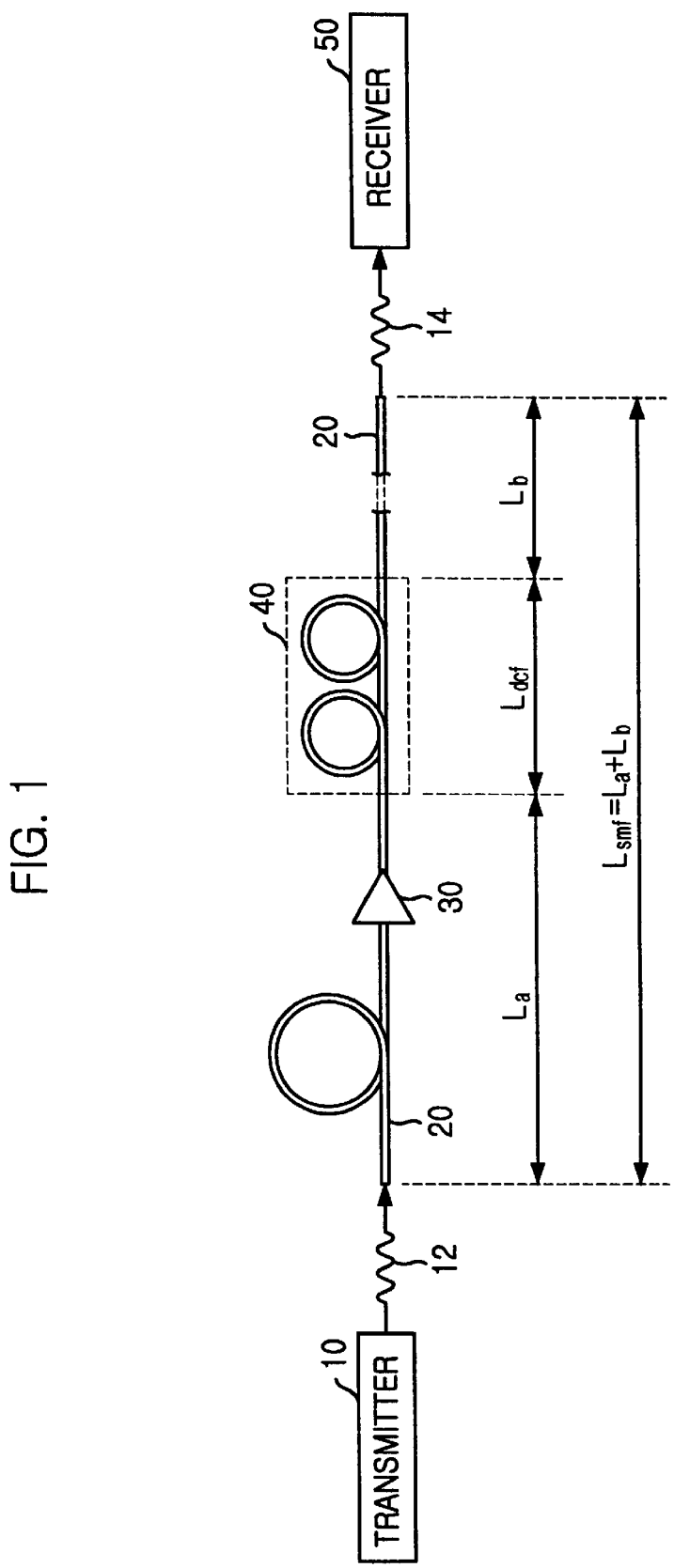
FIG. 1 is a schematic diagram illustrating an optical transmission system having a dispersion compensator in accordance with the present invention.

FIG. 1 is a schematic diagram illustrating an optical transmission system having a dispersion compensator in accordance with the present invention.

Referring to FIG. 1, in the optical transmission system, a transmitter 10 emits an optical signal 12. A single-mode optical fiber 20 receives the optical signal 12 emitted by the transmitter 10 and provides a path where the optical signal 12 is passed therethrough and is coupled to an erbium-doped fiber amplifier (EDFA) 30. An erbium-doped fiber amplifier (EDFA) 30 amplifies the optical signal 12, which is then fed to a dispersion compensator 40. The dispersion compensator 40, connected to the erbium-doped fiber amplifier 30, simultaneously compensates a dispersion value and a dispersion slope in the single-mode optical fiber 20 to transmit a compensated optical signal 14 to a receiver 50.

Figure 2:
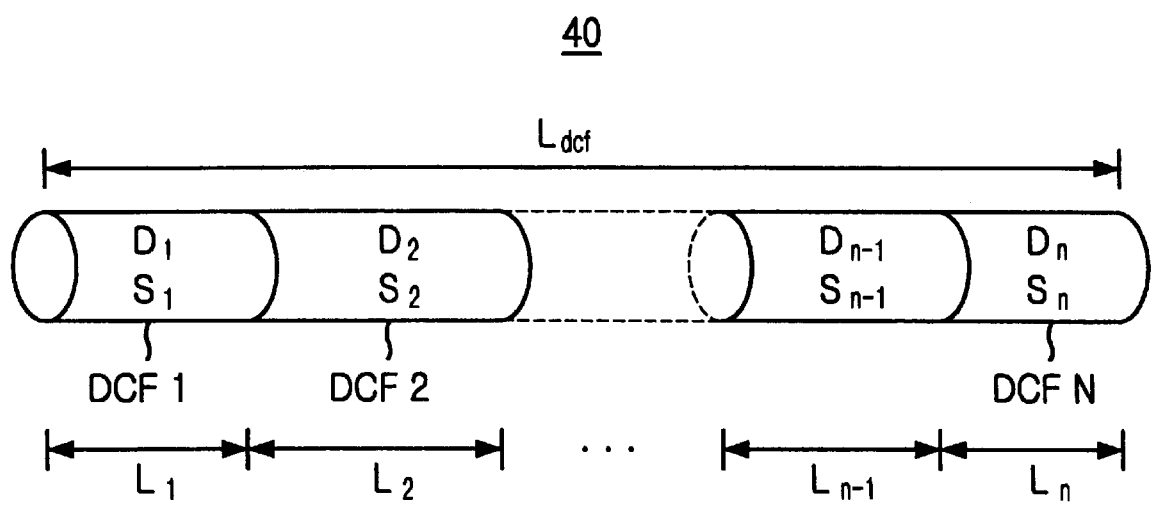
FIG. 2 is a diagram illustrating a dispersion compensator shown in FIG. 1.

FIG. 2 is a diagram illustrating the dispersion compensator shown in FIG. 1, which includes a dispersion compensating fiber.

In order to compensate for dispersion of the single-mode optical fiber 20 having a predetermined dispersion value per a unit length, a predetermined dispersion slope per a unit-length and a predetermined length, the dispersion compensating fiber 20 includes N number of component optical fibers DCF1 to DCFN arranged in a serial fashion, N being a positive integer more than one. Here, each of the component optical fibers DCF1 to DCFN has different dispersion values $D_1$ to $D_n$ per a unit length, dispersion slopes $S_1$ to $S_n$ per a unit length, and different lengths $L_1$ to $L_n$ respectively. The dispersion compensating fiber has a total length of $L_{dcf}$. Each length $L_1$ to $L_n$ of the component optical fibers DCF1 to DCFN is calculated as follows:

$$L_{dcf} = \sum_{i=1}^{n} L_i$$

$$\sum_{i=1}^{n} (L_i \times D_i) + L_{smf} \times D_{smf} \cong 0$$

$$\frac{S_{smf}}{D_{smf}} \cong \frac{\sum_{i=1}^{n} L_i \times S_i}{\sum_{i=1}^{n} (L_i \times D_i)}$$

where, $D_{smf}$ is a dispersion value per a unit length of the single-mode optical fiber, $S_{smf}$ is a dispersion slope per a unit length of the single-mode optical fiber, $L_{smf}$ is a length of the single-mode optical fiber, $D_i$ is a dispersion value per a unit length of each component optical fiber, $S_i$ is a dispersion slope per a unit length of each component optical fiber, and $L_i$ is a length of each component optical fiber.

At this time, each component optical fiber satisfies the following conditions:

a) at least one of the component optical fibers has the dispersion value per a unit length smaller than −80 ps/(nm·km) in the optical wavelength band of 1550 nm;

b) at least one of the component optical fibers has a value, which is produced by dividing the dispersion value per the unit length by the dispersion slope per the unit length, wherein the value is identical to or greater than 300 nm, or identical to or smaller than zero in the optical wavelength band of 1550 nm; and c) at least one of the component optical fibers has a value, which is produced by dividing the dispersion value per the unit length by the dispersion slope per the unit length, wherein the value is identical to or smaller than 240 nm in the optical wavelength band of 1550 nm.

For example, in the case where the dispersion compensation device includes two component optical fibers, lengths $L_1$ and $L_2$ of first and second component optical fibers, respectively, are determined by using Eq. 3 to Eq. 5.

$$L_{dcf} = L_1 + L_2 \tag{Eq. 6}$$

$$L_1 \times D_1 + L_2 \times D_2 + L_{smf} \times D_{smf} \cong 0 \tag{Eq. 7}$$

$$\frac{S_{smf}}{D_{smf}} \cong \frac{L_1 \times S_1 + L_2 \times S_2}{L_1 \times D_1 + L_2 \times D_2} \tag{Eq. 8}$$

where, $S_{smf}$ is the dispersion slope per the unit length of the single-mode optical fiber, $D_{smf}$ is the dispersion value per the single-mode optical fiber, $L_{smf}$ is the length of the single-mode optical fiber, $D_1$ and $D_2$ are a dispersion value per a unit length of the first and second component optical fibers, respectively, $S_1$ and $S_2$ are a dispersion slope per the unit length of the first and second component optical fibers, respectively, and $L_1$ and $L_2$ are a length of the first and second component optical fibers, respectively.

At this time, at least one of the first and second component optical fibers has the dispersion value per the unit length smaller than −80 ps (nm·km) in the optical wavelength band of 1550 nm. At least one of the first and second component optical fibers has a value, which is produced by dividing the dispersion value per the unit length by the dispersion slope per the unit length, wherein the value is identical to or greater than 300 nm, or identical to or smaller than zero in the optical wavelength band of 1550 nm, and the other has the value identical to or smaller than 240 nm in the optical wavelength band of 1550 nm.

As can be seen from the above, it should be readily appreciated that the dispersion compensation device is fabricated by arranging in a serial fashion at least two component optical fibers having the different dispersion value and the different dispersion slope, to thereby simultaneously compensate the dispersion and the dispersion slope, improving the reliability of the dispersion compensation device and reducing a manufacturing cost.

While the present invention has been described with respect to certain preferred embodiments only, other modifications and variation may be made without departing from the spirit and scope of the present invention as set forth in the following claims.

What is claimed is:

1. An apparatus, for use in an optical transmission link having a single-mode optical fiber, for simultaneously compensating a dispersion value and a dispersion slope in the single-mode optical fiber, comprising:

a dispersion compensating module comprising N number of component optical fibers arranged in a serial fashion, N being a positive integer more than one, wherein each of the slope per a unit length and a different length, wherein each length of the component optical fibers is described as:

$$\sum_{i=1}^{n} (L_i \times D_i) + L_{smf} \times D_{smf} \cong 0$$

$$\frac{S_{smf}}{D_{smf}} \cong \frac{\sum_{i=1}^{n} L_i \times S_i}{\sum_{i=1}^{n} (L_i \times D_i)}$$

where, $D_{smf}$ is a dispersion value per a unit length of the single-mode optical fiber, $S_{smf}$ is a dispersion slope per a unit length of the single-mode optical fiber, $L_{smf}$ is a length of the single-mode optical fiber, $D_i$ ($1 \leq I \leq n$, n is a positive integer) is a dispersion value per a unit length of the i-th optical fiber, S is a dispersion slope per a unit length of the i-th optical fiber, and $L_i$ is a length of the i-th optical fiber.

2. The apparatus as recited in claim 1, wherein at least one of the optical fibers has the dispersion value per a unit length smaller than −80 ps/(nm·km) in an optical wavelength band of 1550 nm.

3. The apparatus as recited in claim 2, wherein at least one of the optical fibers has a first value, which is produced by dividing the dispersion value per the unit length by the dispersion slope per the unit length, wherein the value is identical to or greater than 300 nm in the optical wavelength band of 1550 nm; and at least one other one of the optical fibers has a second value, which is generated by dividing the dispersion value per the unit length by the dispersion slope per the unit length, wherein the value is identical to or smaller than 240 nm in the optical wavelength band of 1550 nm.

4. The apparatus as recited in claim 2, wherein at least one of the optical fibers has a first value, which is produced by dividing the dispersion value per the unit length by the dispersion slope per the unit length, wherein the first value is identical to or smaller than zero; and wherein at least one other one of the optical fibers has a second value, which is generated by dividing the dispersion value per the unit length by the dispersion slope per the unit length, wherein the second value is identical to or smaller than 240 nm in the optical wavelength band of 1550 nm.

5. An optical transmission system for transmitting an optical signal emitted by a transmitter to a receiver, comprising:

a transmission link having a single-mode optical fiber for providing a path where the optical signal is passed therethrough; and a dispersion compensating module, connected to the transmission link, including N number of optical fibers arranged in a serial fashion, N being a positive integer more than one, each of the optical fibers having a different dispersion value per a unit length, a different dispersion slope per a unit length and a different length, wherein each length of the optical fibers is described as:

$$\sum_{i=1}^{n} (L_i \times D_i) + L_{smf} \times D_{smf} \cong 0$$

$$\frac{S_{smf}}{D_{smf}} \cong \frac{\sum_{i=1}^{n} L_i \times S_i}{\sum_{i=1}^{n} (L_i \times D_i)}$$

where, $D_{smf}$ is a dispersion value per a unit length of the single-mode optical fiber, $S_{smf}$ is a dispersion slope per a unit length of the single-mode optical fiber, $L_{smf}$ is a length of the single-mode optical fiber, $D_i$ ($1 \leq i \leq n$) is a dispersion value per a unit length of the i-th optical fiber, $S_i$ is a dispersion slope per a unit length of the i-th optical fiber, and $L_i$ is a length of the i-the optical fiber.

6. The optical transmission system as recited in claim 5, wherein at least one of the optical fibers has the dispersion value per a unit length smaller than −80 ps/(nm·km) in an optical wavelength range of 1550 nm.

7. The optical transmission system as recited in claim 6, wherein at least one of the optical fibers has a first value, which is produced by dividing the dispersion value per the unit length by the dispersion slope per the unit length, wherein the value is identical to or greater than 300 nm in the optical wavelength band of 1550 nm; and at least one other one of the optical fibers has a second value, which is generated by dividing the dispersion value per the unit length by the dispersion slope per the unit length, wherein the value is identical to or smaller than 240 nm in the optical wavelength band of 1550 nm.

8. The optical transmission system as recited in claim 6, wherein at least one of the optical fibers has a first value, which is produced by dividing the dispersion value per the unit length by the dispersion slope per the unit length, wherein the first value is identical to or smaller than zero; and wherein at least one other one of the optical fibers has a second value, which is generated by dividing the dispersion value per the unit length by the dispersion slope per the unit length, wherein the second value is identical to or smaller than 240 nm in the optical wavelength band of 1550 nm.

\* \* \* \* \*